United States Patent
Macri et al.

(10) Patent No.: US 7,180,523 B1
(45) Date of Patent: Feb. 20, 2007

(54) TRIMMING SURFACES

(75) Inventors: Dean P. Macri, Banks, OR (US); Kim Pallister, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,343

(22) Filed: Mar. 31, 2000

(51) Int. Cl.
*G09G 5/00* (2006.01)

(52) U.S. Cl. ..................................... 345/582
(58) Field of Classification Search ............... 345/582, 345/420, 421, 620, 629
See application file for complete search history.

(56) References Cited

U.S. PATENT DOCUMENTS

| | | |
|---|---|---|
| 4,600,919 A | 7/1986 | Stern |
| 4,747,052 A | 5/1988 | Hishinuma et al. |
| 4,835,712 A | 5/1989 | Drebin et al. |
| 4,855,934 A | 8/1989 | Robinson |
| 4,901,064 A | 2/1990 | Deering |
| 5,124,914 A | 6/1992 | Grangeat |
| 5,163,126 A | 11/1992 | Einkauf et al. |
| 5,299,302 A * | 3/1994 | Fiasconaro ............ 345/629 |
| 5,363,478 A * | 11/1994 | Fiasconaro ............ 345/441 |
| 5,371,778 A | 12/1994 | Yanof et al. |
| 5,377,320 A * | 12/1994 | Abi-Ezzi et al. ........... 345/502 |
| 5,611,030 A | 3/1997 | Stokes |
| 5,701,404 A * | 12/1997 | Stevens et al. ........... 345/423 |
| 5,731,819 A | 3/1998 | Gagne et al. |
| 5,757,321 A | 5/1998 | Billyard |
| 5,786,822 A | 7/1998 | Sakaibara |
| 5,805,782 A | 9/1998 | Foran |
| 5,809,219 A | 9/1998 | Pearce et al. |
| 5,812,141 A | 9/1998 | Kamen et al. |
| 5,847,712 A | 12/1998 | Salesin et al. |
| 5,894,308 A | 4/1999 | Isaacs |
| 5,929,860 A | 7/1999 | Hoppe |
| 5,933,148 A | 8/1999 | Oka et al. |
| 5,949,969 A | 9/1999 | Suzuoki et al. |
| 5,966,133 A * | 10/1999 | Hoppe ..................... 345/420 |
| 5,966,134 A | 10/1999 | Arias |
| 5,974,423 A | 10/1999 | Margolin |
| 6,054,999 A | 4/2000 | Strandberg |
| 6,057,859 A | 5/2000 | Handelman et al. |
| 6,078,331 A | 6/2000 | Pulli et al. |
| 6,115,050 A | 9/2000 | Landau et al. |
| 6,175,655 B1 | 1/2001 | George et al. |
| 6,191,787 B1 | 2/2001 | Lu et al. |
| 6,191,796 B1 | 2/2001 | Tarr |
| 6,198,486 B1 | 3/2001 | Junkins et al. |
| 6,201,549 B1 | 3/2001 | Bronskill |

(Continued)

OTHER PUBLICATIONS

Foley et al., Computer Graphics: Principles and Practice, 1996, pp. 741-743.*

(Continued)

*Primary Examiner*—Kee M. Tung
*Assistant Examiner*—Motilewa Good-Johnson
(74) *Attorney, Agent, or Firm*—Fish & Richardson P.C.

(57) ABSTRACT

Trimming textures are obtained and applied to parametric surface. The trimming textures are stored as texture maps and are applied to provide a visual sensation of absence when rendering an image. The trimming texture may be obtained in a pre-rendering process and applied to the parametric surface in a run-time process using a 3D graphics accelerator.

24 Claims, 9 Drawing Sheets

U.S. PATENT DOCUMENTS

| | | | |
|---|---|---|---|
| 6,208,347 | B1 | 3/2001 | Migdal et al. |
| 6,219,070 | B1 | 4/2001 | Baker et al. |
| 6,239,808 | B1 | 5/2001 | Kirk et al. |
| 6,252,608 | B1 | 6/2001 | Snyder et al. |
| 6,262,737 | B1 | 7/2001 | Li et al. |
| 6,262,739 | B1 | 7/2001 | Migdal et al. |
| 6,292,192 | B1 * | 9/2001 | Moreton .................... 345/586 |
| 6,317,125 | B1 | 11/2001 | Persson |
| 6,337,880 | B1 | 1/2002 | Cornog et al. |
| 6,388,670 | B2 | 5/2002 | Naka et al. |
| 6,405,071 | B1 | 6/2002 | Analoui |
| 6,437,782 | B1 | 8/2002 | Pieragostini et al. |
| 6,478,680 | B1 | 11/2002 | Yoshioka et al. |
| 6,559,848 | B2 | 5/2003 | O'Rourke |
| 6,593,924 | B1 | 7/2003 | Lake et al. |
| 6,593,927 | B2 | 7/2003 | Horowitz et al. |
| 6,600,485 | B1 * | 7/2003 | Yoshida et al. ............. 345/419 |
| 6,608,627 | B1 | 8/2003 | Marshall et al. |
| 6,608,628 | B1 | 8/2003 | Ross et al. |
| 2001/0026278 | A1 | 10/2001 | Arai et al. |
| 2002/0101421 | A1 | 8/2002 | Pallister |

OTHER PUBLICATIONS

Rockwood et al., Real time rendering of trimmed surfaces, 1989, ACM, pp. 107-116.*

Kumar et al., Interactive display of large scale NURBS models, 1995, ACM, Symposium on Interactive 3D Graphics, pp. 51-58, 206.*

Coelho et al., An algorithm for intersecting and trimming parametric meshes, 1998, ACM, SIGGRAPH, pp. 1-8.*

Pedersen, A framework for interactive texturing on curved surfaces, 1996, ACM, pp. 295-301.*

Lewis "Pose Space Deformation: A Unified Approach to Shape Interpolation and Skeleton-Driven Deformation" Centropolis, New Orleans, LA, 165-172.

Lasseter "Principles of Traditional Animation Applied to 3D Computer Animation" Pixar, San Rafael, California, 1987.

Thomas (Contributor) et al., "The Illusion of Life: Disney Animation" 47-51.

Hoppe, "Progressive Meshes" Microsoft Research, 99-108, http://www.research.microsft.com/research/graphics/hoppe/.

Popovic et al., "Progressive Simplicial Complexes" Microsoft Research, http://www.research.microsft.com/~hoppe/.

Hoppe "Efficient Implementation of progressive meshes" Coput. & Graphics vol. 22, No. 1, pp. 27-36, 1998.

Taubin et al., "Progressive Forest Spilt Compression" IBM T.J. Watson Research Center, Yorktown Heights, NY.

Cohen-Or et al., "Progressive Compression of Arbitrary Triangular Meshes" Computer Science Department, School of Mathematical Sciences, Tel Aviv, Israel.

Bajaj et al., "Progressive Compression and Transmission of Arbitrary Triangular Meshes" Department of Computer Sciences, University of Texas at Austin, Austin, TX.

Pajarola et al., "Compressed Progressive Meshes" Graphics, Visualization & Usability Center, College of Computing, Georgia Institute of Technology, Jan. 1999.

Alliez et al., "Progressive Compression for Lossless Transmission of Triangle Meshes" University of Southern California, Los Angeles, CA, 195-202.

Chow "Optimized Geometry Compression for Real-time Rendering" Massachusetts Institute of Technology, Proceedings Visualization 1997, Oct. 19-24, 1997, Phoenix, AZ, 347-354.

Markosian "Real-Time Nonphotorealistic Rendering" Brown University site of the NSF Science and Technology Center for Computer Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "SKETCH: An Interface for Sketching 3D Scenes" Brown University site of the NSF Science and Technology Center for Computer Graphics and Scientific Visualization, 1996.

Landsdown et al., "Expressive Rendering: A Review of Nonphotorealistic Techniques" IEEE Computer graphics and Applications, 29-37, 1995.

Raskar "Image Precision Silhouette Edges" University of North Carolina at Chapel Hill, Microsoft Research, 1999 Symposium on Interactive 3D Graphics Atlanta, GA, 135-231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Samet "Applications of spatial data structures: computer graphics, image processing, and GIS" University of Maryland, Addison-Wesley Publishing Company, 1060-1064, Reading, MA, Jun. 1990.

Dyn "A Butterfly Subdivision Scheme for Surface Interpolation with Tension Control" ACM Transactions on Graphics, vol. 9, No. 2, Apr. 1990.

Zorin "Interpolation Subdivision for Meshes With Arbitrary Topology" Department of Computer Science, California Institute of Technology, Pasadena, CA.

Lee "Navigating through Triangle Meshes Implemented as linear Quadtrees" Computer Science Department, Center for Automation Research, Institute for Advanced Computer Studies, University of Maryland College Park, MD, Apr. 1998.

Alliez et al., "Progressive Compression for Lossless Transmission of Triangle Meshes," *ACM SIGGRAPH 2001*, pp. 195-202 (2001).

Appel, Arthur, "The Notion of Quantitative Invisibility and the Machine Rendering of Solids." Proceedings of 22nd National Conference Association for Computing Machinery 1967.

Bajaj et al., "Progressive Compression and Transmission of Arbitrary Triangular Meshes," *IEEE*, pp. 307-316 (1999).

Buck et al., "Performance-Driven Hand Drawn Animation", *ACM* (NPAR2000), pp. 101-108 (2000).

Catmull et al., "Recursively Generated B-Spline Surfaces on Arbitrary Topological Meshes," Computer Aided Design, 10(6):350-355 (1978).

Chow, M., "Optimized Geometry Compression for Real-time Rendering," *IEEE*, pp. 347-354 (1997).

Coelho et al., "An Algorithm for Intersecting and Trimming Parametric Meshes", *ACM* SIGGRAPH, pp. 1-8 (1998).

Cohen-Or, D. et al., "Progressive Compression of Arbitrary Triangular Meshes," *IEEE Visualization 99* Conference Proc., pp. 67-72 (1999).

Deering, M., "Geometry Compression," *Computer Graphics*. SIGGRAPH '95, pp. 13-20, 1995.

DeRose et al., "Subdivisional Surfaces in Character Animation", *ACM*, SIGGRAPH'98, pp. 85-94 (1998).

Dyn, N. et al., "A Butterfly Subdivision Scheme for Surface Interpolation with Tension Control," *ACM Transactions on Graphics*, 9(2):160-169 (1990).

Elber, Gershon, "Line Art Rendering via a Coverage of Isoperimetric Curves," IEEE Transactions on Visualization and Computer Graphics, 1(3):231-239 (1995).

Elber, Gershon, "Interactive Line Art Rendering of Freeform Surfaces", *Eurographics'99*, 18(3):C1-C12 (1999).

Gooch et al., "A Non-Photorealistic Lighting Model for Automatic Technical Illustration," *Computer Graphics Proceedings, Annual Conference Series, SIGGRAPH'98*, pp. 447-452 (1998).

Gooch et al., "Interactive Technical Illustration," *ACM Interactive 3D*, pp. 31-38 (1999).

Heidrich et al., "Realistic, Hardware-Accelerated Shading and Lighting," *ACM*, (SIGGRAPH'99), pp. 171-178 (1999).

Hoppe, H., "Progressive Meshes," URL:http://www.research.microsft.com/research/graphics/hoppe/, (10 pgs.).

Hoppe, H., "Efficient Implementation of Progressive Meshes," Comput. & Graphics, 22(1), pp. 27-36 (1998).

Hoppe, H., "View-Dependent Refinement of Progressive Meshes", URL:http://www.research.microsoft.com/~hoppe/ (10 pgs.).

Kumar et al., "Interactive Display of Large Scale NURBS Models", *ACM*, Symp. On Interactive 3D Graphics, pp. 51-58 (1995).

Lake et al., "Stylized Rendering Techniques for Scalable Real-Time 3D Animation", NPAR, pp. 101-108 (2000).

Lander, Jeff, "Making Kine More Flexible," Game Developer Magazine, 5 pgs., Nov. 1998.

Lander, Jeff, "Skin Them Bones," Game Developer Magazine, 4 pgs., May 1998.

Lansdown et al., "Expressive Rendering: A Review of Nonphotorealistic Techniques," IEEE Computer Graphics & Applications, pp. 29-37 (1995).

Lasseter, J. et al., "Principles of Traditional Animation Applied to 3D Computer Animation," *ACM*, pp. 35-44 (1987).

Lee, M. et al., "Navigating Through Triangle Meshes Implemented as Linear Quadtrees," *ACM Transactions on Graphics*, 19(2):79-121 (2000).

Lewis, J. P. et al., "Pose Space Deformation: A Unified Approach to Shape Interpolation and Skeleton-Driven Deformation," *ACM*, (SIGGRAPH 2000), pp. 165-172 (2000).

Ma et al., "Extracting Feature Lines for 3D Unstructured Grids," *IEEE*, pp. 285-292 (1997).

Markosian, L. et al., "Real-Time Nonphotorealistic Rendering," SIGGRAPH'97, 6 pgs. (1997).

Pajarola et al., "Compressed Progressive Meshes" *IEEE Transactions on Visualization and Computer Graphics*, 6(1):79-93 (2000).

Pedersen, "A Framework for Interactive Texturing on Curved Surfaces", *ACM*, pp. 295-301 (1996).

"pmG Introduces Messiah: Animate 3.0", URL:http://www.digitalproducer.com/aHTM/Articles/july_2000/july_17_00/pmg_intros_messiah_animate.htm (Accessed Oct. 26, 2004) 2 pgs.

Popovic et al., "Progressive Simplicial Complexes" Microsoft Research, http://www.research.microsft.com/~hoppe/.

Pueyo, X. et al., "Rendering Techniques '96" Proc. of Eurographics Rendering Workshop 1996, EUROGRAPHICS, pp. 61-70 (1996).

Raskar, R. et al., "Image Precision Silhouette Edges," Symposium on Interactive 3D Graphics, *ACM*, pp. 135-231 (1999).

Rockwood, A. et al., "Real-time Rendering of Trimmed Surfaces," Computer Graphics (SIGGRAPH '89 Proceedings) 23:107-116 (1989).

Samet, Hanan, "Applications of Spatial Data Structures: Computer Graphics, Image Processing, and GIS," University of Maryland, Addison-Wesley Publishing Company, 1060-1064, Reading, MA, Jun. 1990.

Sousa, M., et al., "Computer-Generated Graphite Pencil Rendering of 3-D Polygonal Models", Eurographics'99, 18(3):C195-C207 (1999).

Stam, J., "Exact Evaluation of Catmull-Clark Subdivision Surfaces at Arbitrary Parameter Values", SIGGRAPH 98 Conference Proceedings, Annual Conference Series, pp. 395-404 (1998).

Taubin et al., "3D Geometry Compression", SIGGRAPH'98 Course Notes (1998).

Taubin et al., "Progressive Forest Spilt Compression," IBM T.J. Watson Research Center, 9 pgs. (1998).

Thomas (Contributor) et al., "The Illusion of Life: Disney Animation" 47-51.

Wilhelms, J. & Van Gelder, A., "Anatomically Based Modeling," Univ. California Santa Cruz [online], 1997 [retrieved Dec. 22, 2004], retrieved from the Internet:<URL:http://graphics.stanford.edu/courses/cs448-01-spring/papers/wilhelms.pdf>.

Zeleznik et al., "SKETCH: An Interface for Sketching 3D Scenes" Brown University site of the NSF Science and Technology Center for Computer Graphics and Scientific Visualization, 1996.

\* cited by examiner

TRIMMING SURFACES

BACKGROUND

This invention relates to trimming a parametric surface.

Trimming is the removal a portion of a surface when rendering an image of the surface. Trimming provides a visual sensation of absence, meaning the appearance of removing a portion of the image.

DESCRIPTION OF DRAWINGS

Like reference symbols in the various drawings indicate like elements.

DETAILED DESCRIPTION

The following embodiments render two-dimensional (2D) images from data for trimmed three-dimensional (3D) models. A trimmed 3D model is a 3D model that has a portion of the model's surface removed during the rendering process by one or more parametric 2D functions (referred to as 'trimming curves'). The trimmed effect is achieved by applying a 'trimming texture' (that is, a texture map image representation of the trimming curve function or functions) to the surface of the 3D model.

A trimmed image 10 (FIG. 1) of a parametric surface 12 (that is, a surface described with an equation and at least one control points and one or more trimming curves) has a solid portion 14 and a trimmed portion 16. Solid portion 14 provides a visual sensation of being a solid, tangible surface 12. Trimmed portion 16 provides a visual sensation of being absent, missing or transparent. Here, trimmed portion 16 appears blank, but in other embodiments may appear transparent, revealing whatever elements, if any, are located behind surface 12.

Figure 1:
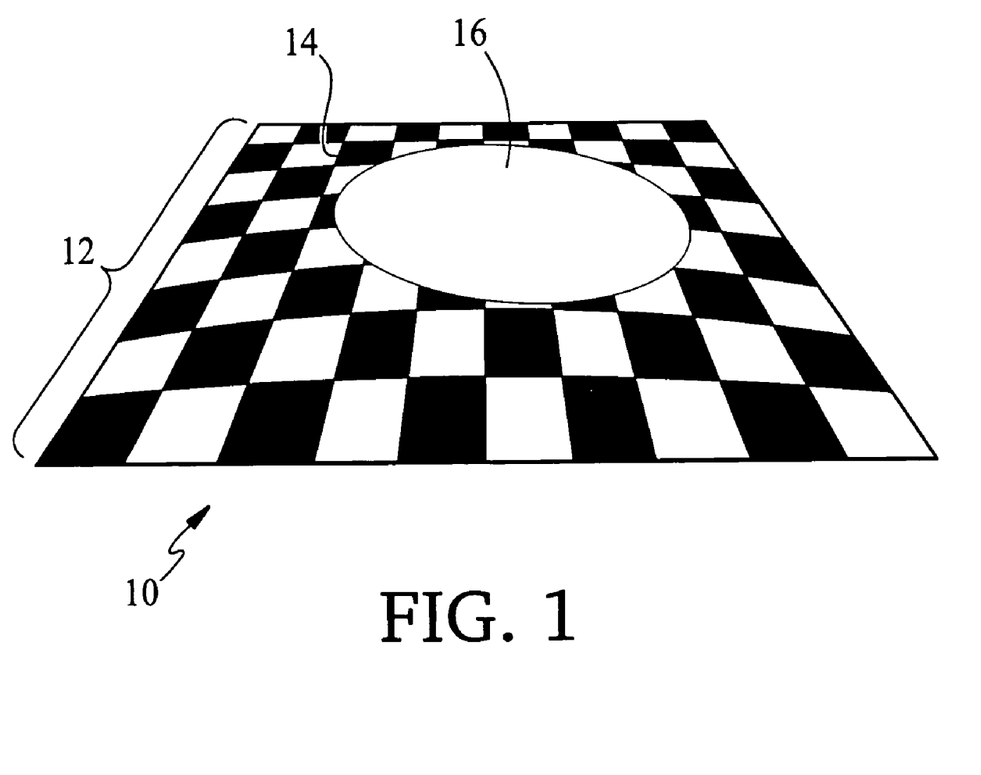
FIG. 1 is a view of a rendered image.
Figure 2:
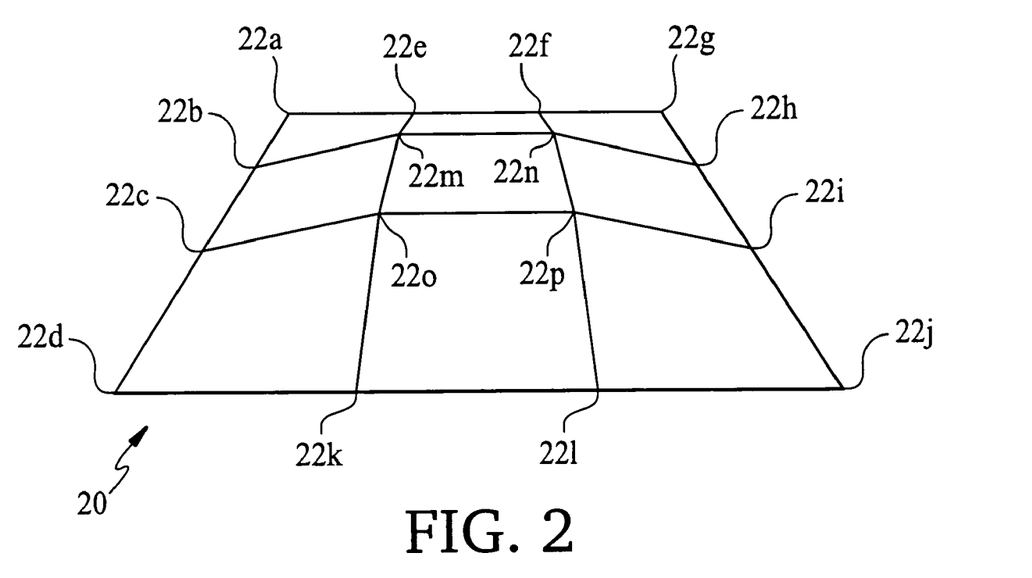
FIG. 2 is a view of a control point lattice for FIG. 1.

Surface 12 of image 10 is modeled using a 3D control point lattice 20 (FIG. 2). Control point lattice 20 has at least one control point, 22a, which defines a location of a point on image 10 in xyz (or other) space. Here, control point lattice 20 has sixteen (16) control points, 22a–p, which together define the location (and hence appearance) of sixteen points on image 10.

Control points 22a–p may be altered to change to the shape (and hence appearance) of image 10. For example, control points 22a–p may be altered to create a trampoline or a balloon effect, where the center portion of image 10 (controlled by 22m–p) rises and falls much like a flexing trampoline or an inflating and deflating balloon. The parametric surface 12 of image 10 may be modeled by one or more mathematical functions. For example, a vector-valued function S(u,v) that maps from a rectangular bounded region in, uv space (the "range" of S) to a bounded surface in XYZ space. U and v are orthogonal, and may be thought of as horizontal and vertical (though u and v may not map to horizontal and vertical in XYZ space). Additionally, there may be one or more trimming functions (trimming curves) that can be used to further reduce the range of S(u,v) and therefore further reduce the surface in XYZ space.

To control the overall appearance of surface 12 between control points 22a–p of control point lattice 20, a mesh 30 (FIG. 3) is obtained. Mesh 30 is made of many polygons 32, here triangles; however other types of polygons may be used. Each polygon 32 includes coordinates for vertices 34a, 34b and 34c that exist in xyz space. These vertices 34 define a face 36 and edges 38a, 38b and 38c for each polygon 32. Mesh 30 serves as an approximation of surface 12. Here, mesh 30 provides a smooth transition of surface 12 between control points 22a–p; however, other types of transitions may be maintained.

Figure 4:
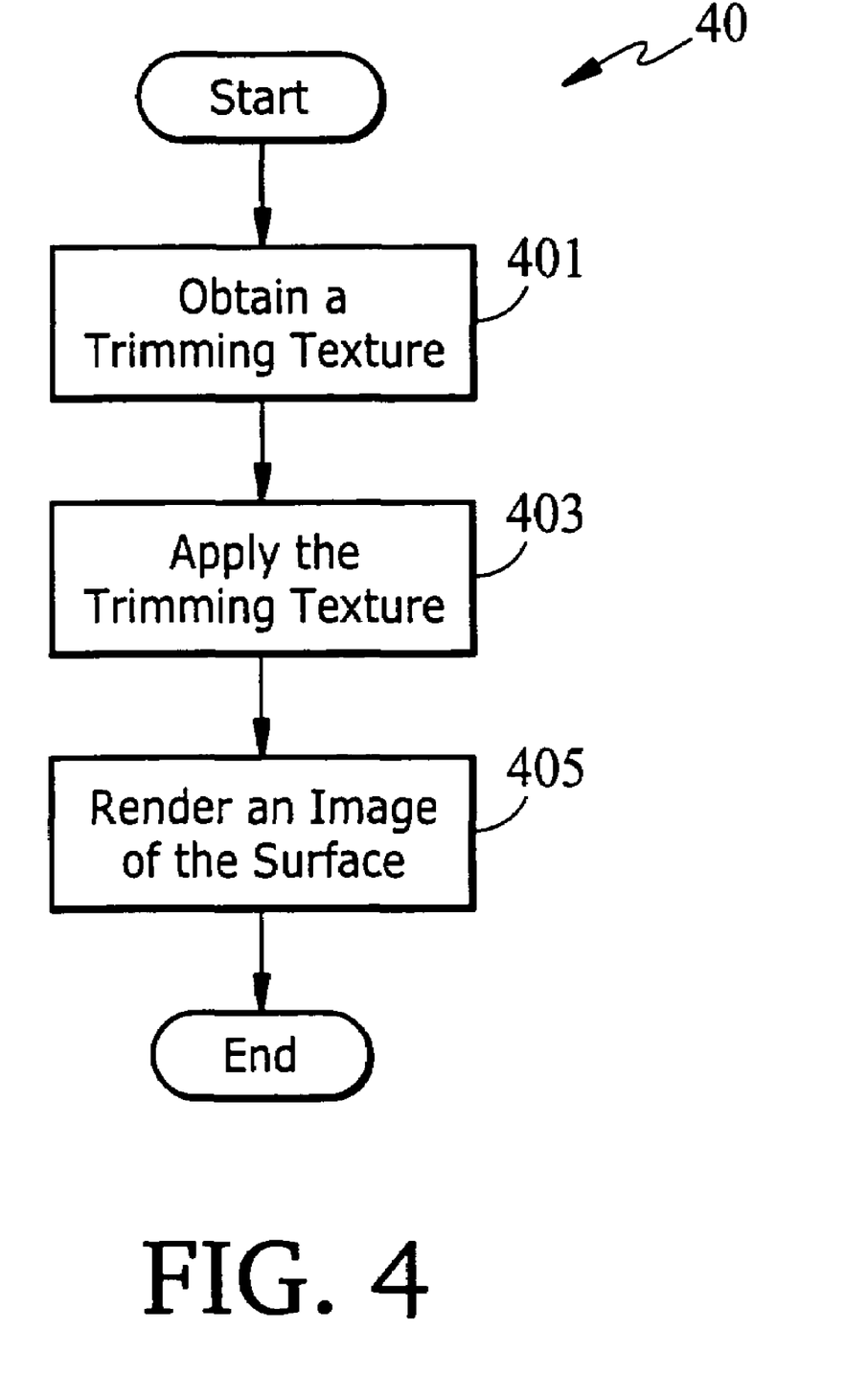
FIG. 4 is a flow diagram of a process for trimming an image according to an embodiment of the invention.
Figure 5:
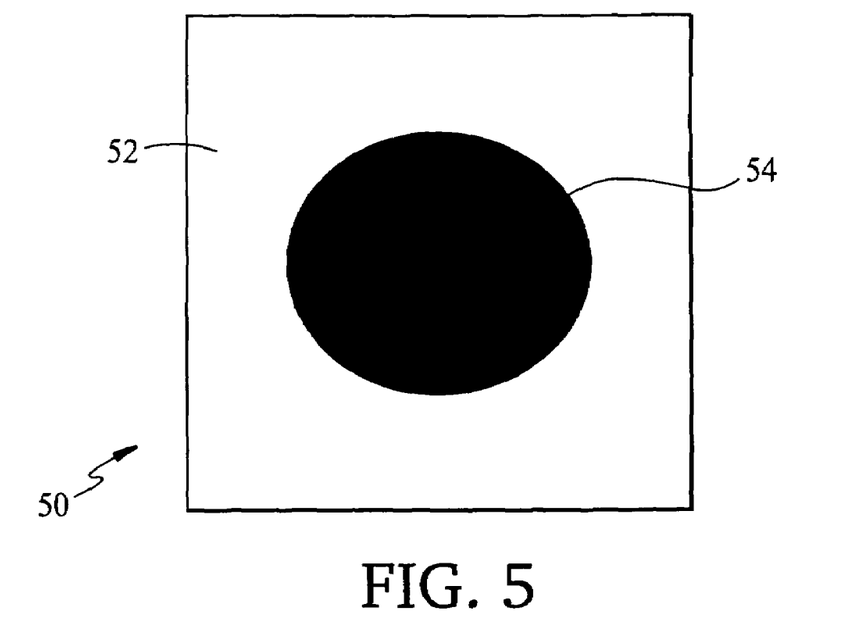
FIG. 5 is a view of a trimming texture.

FIG. 4 shows a process 40 for trimming surface 12 of image 10. Process 40 trims surface 12 based on a trimming texture 50 (FIG. 5). This trimming texture is typically obtained once per mesh 30 in a "pre-rendering" process and stored prior to rendering the image (a pre-rendering process occurs at a time prior to actually rendering the image). Trimming texture 50 includes a rendered section 52 and a trimmed section 54. Rendered section 52, here shown as white, corresponds to the solid portion 14 of surface 12. Trimmed section 54, here shown as black, corresponds to the trimmed portion 16 of surface 12.

Process 40 obtains (401) a trimming texture 50 based on the trimming curves for surface 12. Trimming curves are defined as curves located in the uv space of mapping function S of a surface, for example surface 12, which restrict the drawing of (that is trims) a portion of the surface 12.

A trimming curve 60 (FIG. 6) may be defined so that either the surface to the left, or the right, of the curve is trimmed. For example trimming curve 60, here a clockwise circle, will create a circle if the surface to the right is trimmed and a hole (such as one shown in FIG. 1) if the surface to the left is trimmed. Trimming curves 60 may also be described as vector-valued functions $C_1(t), C_2(t) \ldots, C_n(t)$.

Figure 3:
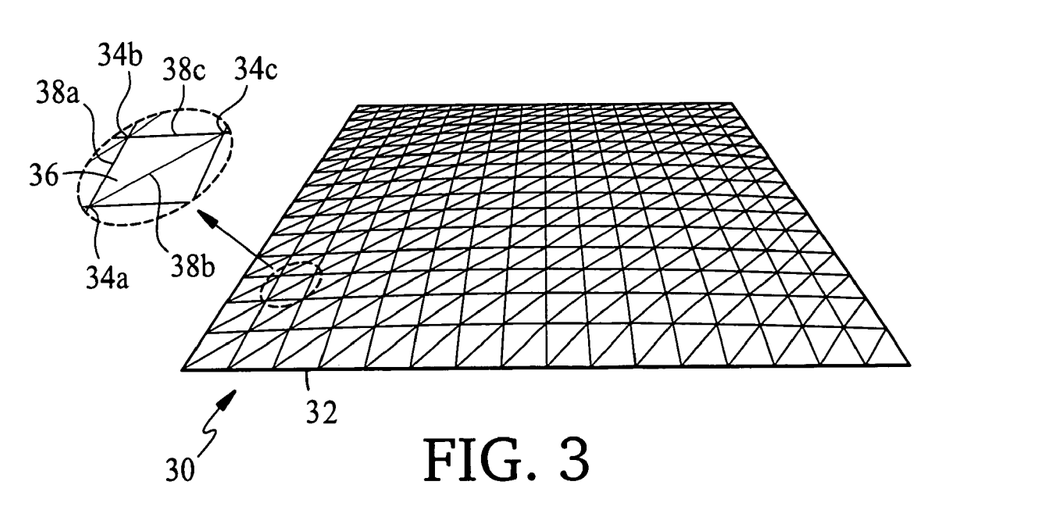
FIG. 3 is a view of a mesh of FIG. 2.
Figure 7:
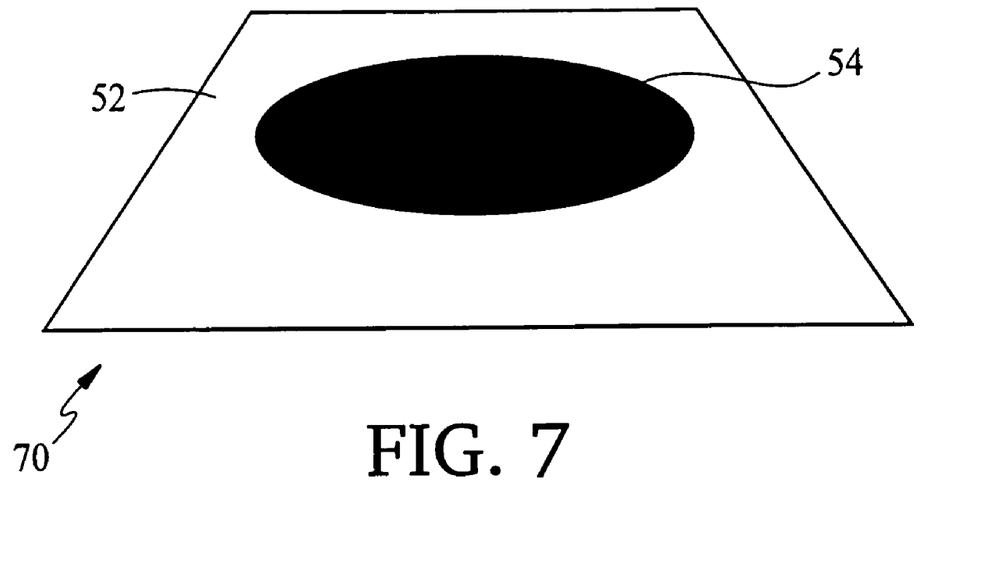
FIG. 7 is a view of the trimming texture in FIG. 5 on the mesh in FIG. 3.

Process 40 applies (403) trimming texture 50 to mesh 30. Process 40 typically applies trimming texture 50 to mesh 30 in a "run-time" process as a texture map (a run time process occurring at the time of actually rendering the image). FIG. 7 shows trimming texture 50 applied (403) to corresponding vertices 34 of mesh 30 (prior to rendering image 10). Where appropriate, trimming texture 50 changes shape corresponding to the changes in shape (such as flexing or stretching), if any, of mesh 30. This change in shape of trimming texture 50 is a result of the application of texture 50 to mesh 30 and does not require a re-computation of trimming curve 60.

Once applied, process 40 renders (405) the image using trimming texture. Trimming texture 50 affects rendering of the image whenever trimming is desired (for example, by a user).

Figure 8:
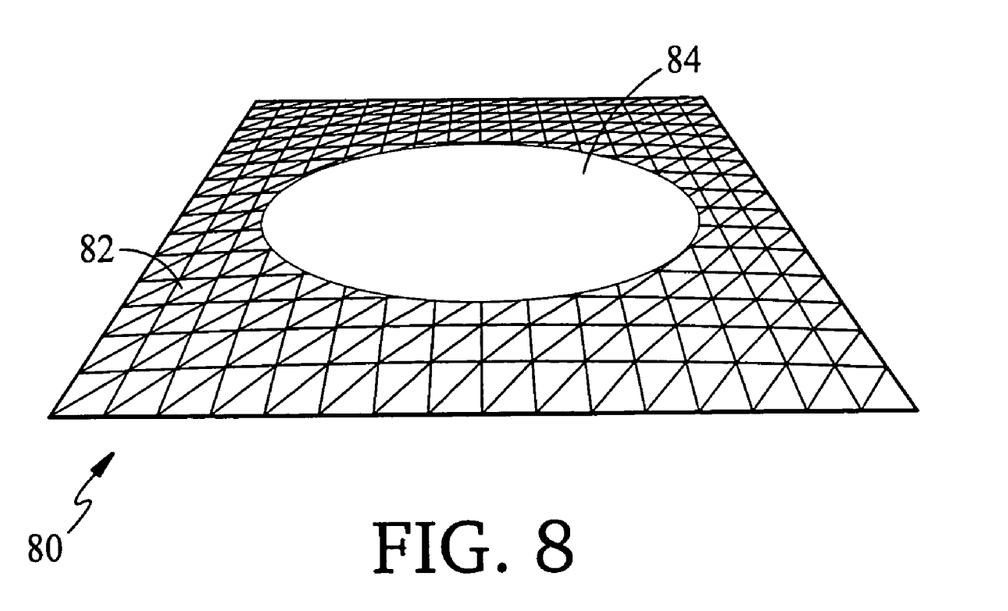
FIG. 8 is a view of the trimming texture in FIG. 5 applied to a rendered image of the mesh in FIG. 3.

Specifically, process 40 limits the drawing of surface 12 to solid portion 14, corresponding to rendered section 52 of trimming texture 50. In other embodiments, trimming texture 50 prevents the drawing of pixels in trimmed section 16, corresponding to trimmed section 54. For example, FIG. 8 shows a rendered image 80 of trimming texture 50 applied to mesh 30. As shown, vertices 34 and edges 38 of polygons 32 are allocated (and hence drawn) for rendered portions 82 of mesh 30 corresponding to rendered region 52. Likewise, vertices 34 and edges 38 of polygons 32 corresponding to trimmed region 54 are absent from trimmed portions 84 of mesh 30.

Figure 9:
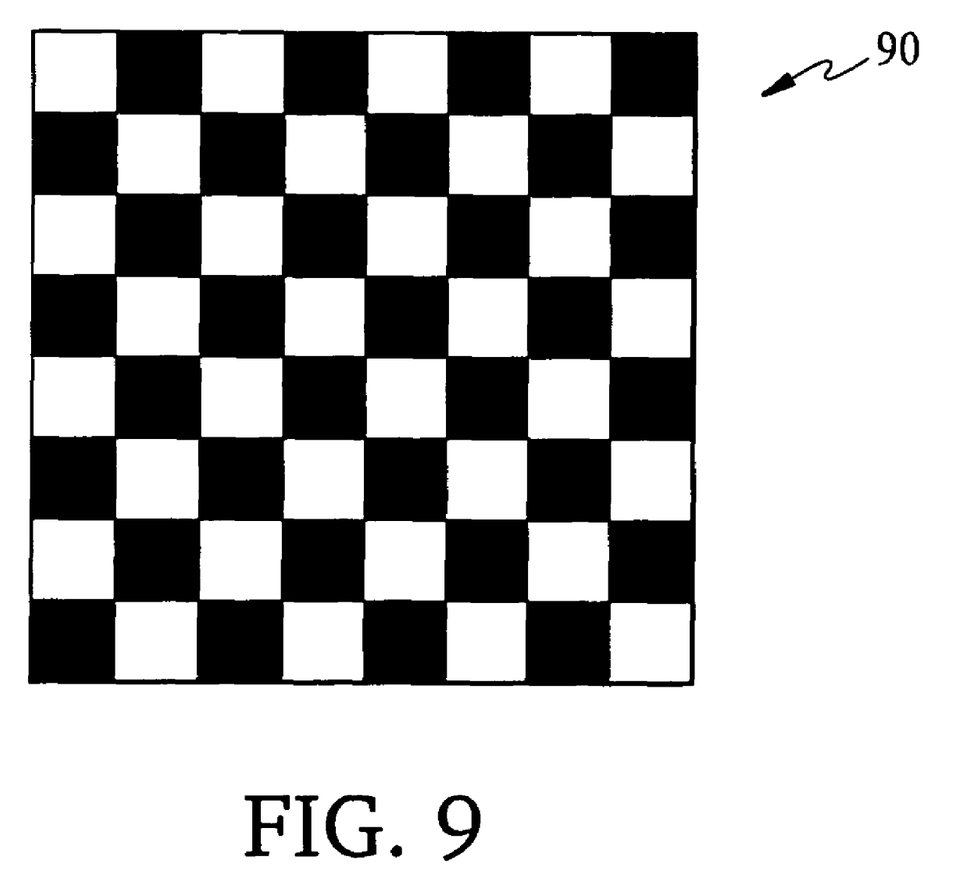
FIG. 9 is a view of a material texture for the image in FIG. 1.

Furthermore, to render image 10 (FIG. 1) a material texture 90 (FIG. 9) may be applied when rendering an image of the surface (405). Material texture 90, here a checkerboard pattern, is applied as a texture map onto mesh 30, however, texture 90 is only rendered in sold regions 14 corresponding to rendered section 52 of trimming texture 50.

Figure 10:
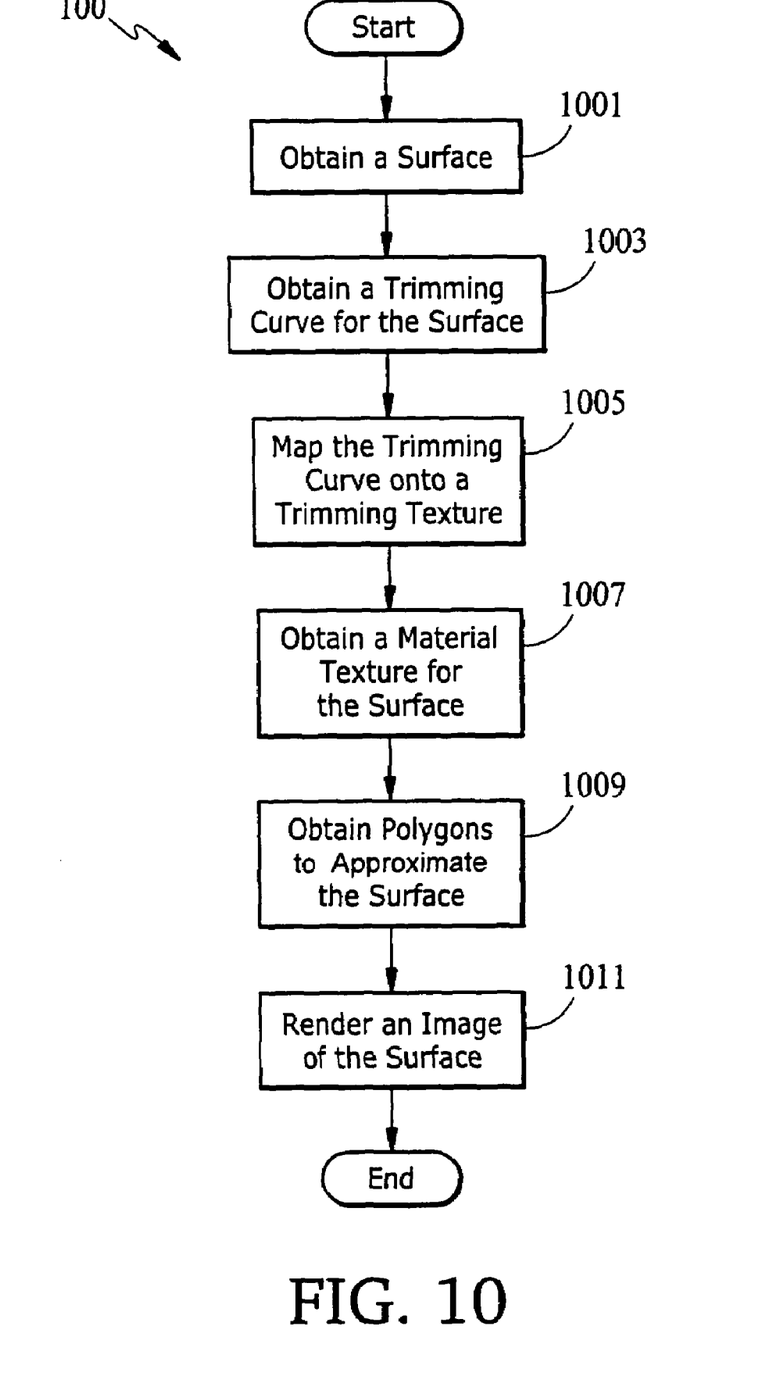
FIG. 10 is a flow diagram of a process for trimming an image according to another embodiment of the invention.

FIG. 10 shows an alternative embodiment, process 100, of the invention. Process 100 obtains a surface (1001), for example surface 12, to be rendered. Surface 12 may be obtained by based on a vector-valued function, S(u,v), which generates the surface in XYZ (or other) space.

Process 100 also obtains a trimming curve (1003), or in other embodiments trimming curves, for surface 12. Trimming curves may be obtained (1003) based on vector-valued functions $C_1(t)$, $C_2(t)$ . . . , $C_n(t)$ which generate trimming curves for surface 12 (in uv space).

Figure 6:
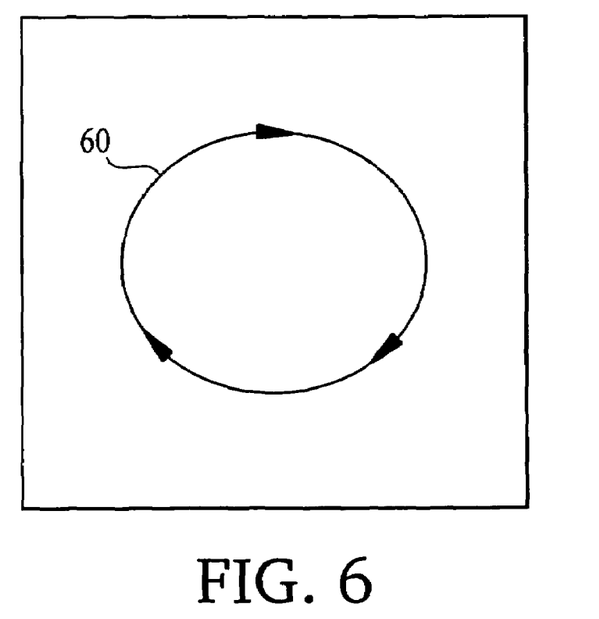
FIG. 6 is a view of a trimming curve.

Each trimming curve, $C_1(t)$, $C_2(t)$, $C_n(t)$ obtained (1003) is mapped (1005) onto a trimming texture 50 for surface 12. The trimming texture 50 is typically obtained once up front in a pre-rendering process based on trimming curve 60 to generate a rendered section 52 and a trimmed section 54 for trimming texture 50.

Process 100 may also obtain (1007) a material texture for surface 12. Material texture 90 (FIG. 9) is, here, a checkerboard material but may be any material provided (for example to a user). Material texture is also typically obtained in a pre-rendering process.

Process 100 obtain (1009) polygons (for example polygons 32) to generate mesh 30 to approximate surface 12. Process 100 may obtain polygons with a tessellation algorithm for approximating surface 12 of image 10 to a desired resolution (for example to support cartoon and/or photo realistic quality images). Typically, process 100 obtains mesh 30 at run-time.

Process 100 renders an image 10 (1011) of surface 12 by applying trimming texture 50 and material texture 90 to polygons 32 of mesh 30. Material texture 90 is drawn as indicated by rendered section 52 and is not drawn as indicated by trimmed section 54. An example of a pseudo-code to implement process 100 is shown in attached appendix.

Processes 40 and 100 may be used to create animation cels for cartooning. For example, a 3D model, such as image 10, may be generated and then positioned in a desired manner in a scene. Processes 40 and 100 may be executed on the model to produce a 2D image for that position. Then, the 3D model can be re-positioned (for example, rotated), and process 40 or 100 (or subparts of 40 and 100) executed on the re-positioned model to produce a 2D image for the new position. This process may be repeated to produce images for any number of positions. In this way, processes 40 and 100 can generate cels automatically.

Processes 40 and 100 may be performed in 3D space, meaning that they are performed using 3D data. By processing data in 3D space (as opposed to 2D space), processes 40 and 100 can be performed using a processor and rendering can be done using graphics accelerator cards of a computer.

Figure 11:
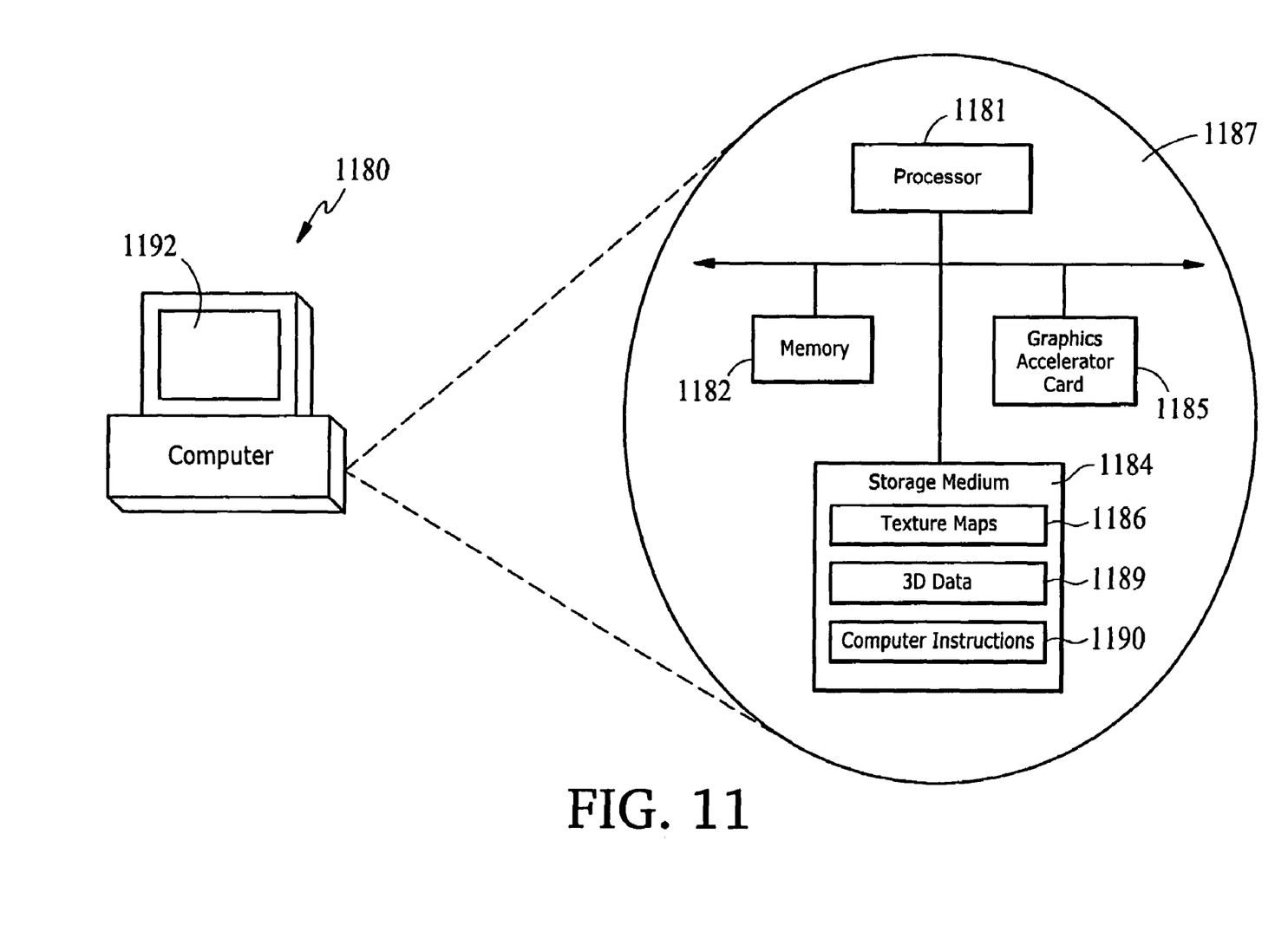
FIG. 11 is a view of computer hardware used to implement one embodiment of the invention.

FIG. 11 shows a computer 1180 for rendering images using processes 40 and 100. Computer 1180 includes a processor 1181, a memory 1182, a storage medium 1184 (e.g., a hard disk), and a 3D graphics accelerator card 1185 (e.g., a hard disk), and a 3D graphics accelerator card 1185 having an alpha-channel for applying textures to 3D model and manipulating 3D data. Storage medium 1184 stores texture maps 1186 containing the trimming texture 50 and material texture 90 described above, 3D data 1189, and computer instructions 1190 for rendering 2D images via processes 40 and 100.

Processes 40 and 100, however, are not limited to use with any particular hardware or software configuration; they may find applicability in any computing or processing environment. Processes 40 and 100 may be implemented in hardware, software, or a combination of the two. Processes 40 and 100 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform processes 40 and 100 and to generate output information. The output information may be applied to one or more output devices, such as display screen 1192.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 40 and 100. Processes 40 and 100 may also be implemented as a computer-readable storage medium, configured with a computer program, where, upon execution, instructions in the computer program cause the computer to operate in accordance with processes 40 and 100.

Figure 12:
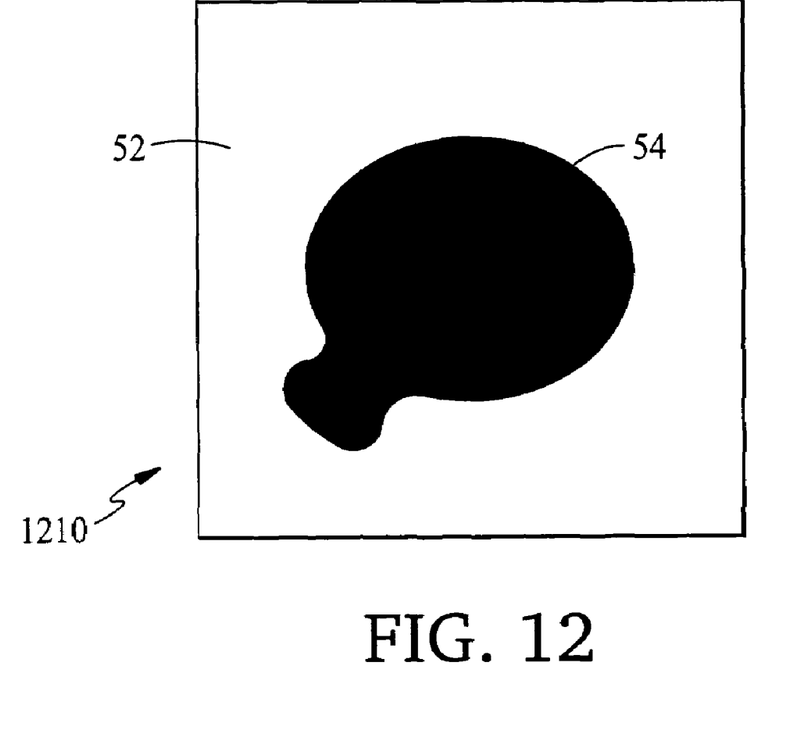
FIG. 12 is a view of an alternate embodiment of a trimming texture.
Figure 13:
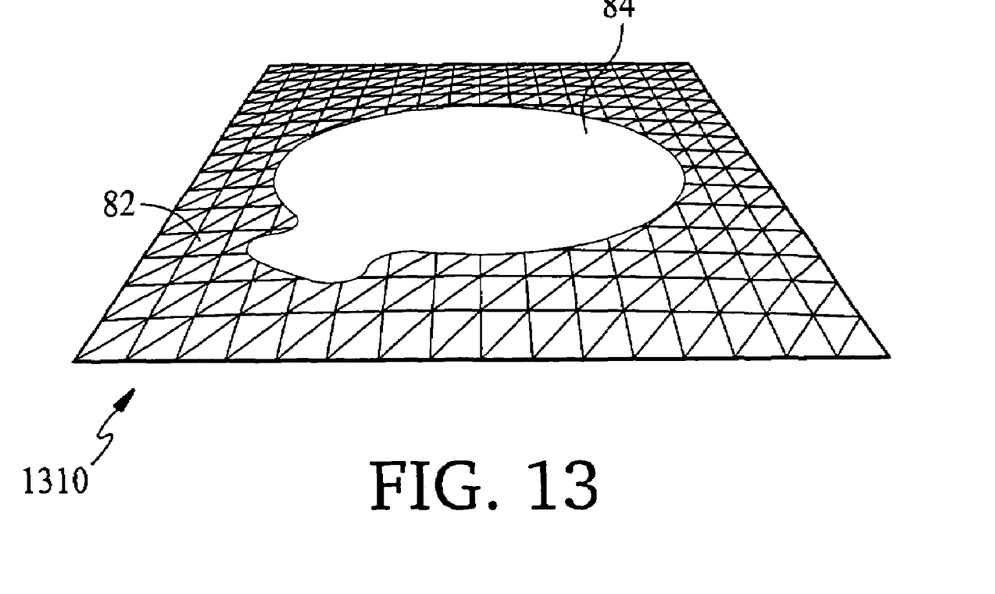
FIG. 13 is a view of the trimming texture in FIG. 11 applied to the mesh in FIG. 3.

A number of embodiments of the invention have been described. Nevertheless, it will be understood that various modifications may be made without departing from the spirit and scope of the invention. For example, trimmed portion 16 may change in shape, size and/or other qualities as desired (for example, as directed by a user or a program). Here, trimmed portion 16 is circular in shape. FIG. 12 shows a trimming texture 1210 having an irregular shape and FIG. 13 shows a rendered image of trimming texture 1210 applied to a mesh 1310. Moreover, trimming texture 50 may further be specifically designed to use texture functionality provided by particular 3D graphic processors. Also, trimming texture 50 may be designed to operate with the alpha-channel of texture blending/mapping hardware in a specific 3D graphics processor. Accordingly, other embodiments are within the scope of the following claims.

What is claimed is:

1. A method of trimming a parametric surface, comprising:

prior to rendering the parametric surface:

producing a trimming texture, the trimming texture comprising a texture map image representation of a trimming curve for the parametric surface, the trimming curve defining trimmed and untrimmed portions, the untrimmed portion comprising opaque pixels and the trimmed portion comprising transparent pixels; and during rendering of the parametric surface:
obtaining a list of polygons that define the parametric surface; and
drawing the polygons to generate the parametric surface, wherein drawing comprises applying the trimming texture to the polygons, the trimming texture being applied by texture mapping the trimming texture onto the polygons to produce the trimmed and untrimmed portions.

2. The method of claim 1, wherein the trimming texture is produced from a plurality of trimming curves for the parametric surface.

3. The method of claim 1, further comprising:
obtaining a material texture for the parametric surface; and
applying the material texture to the untrimmed portion.

4. The method of claim 1, wherein the trimming curve is produced from one or more vector-valued functions.

5. The method of claim 1, wherein the parametric surface is part of a three-dimensional model.

6. The method of claim 1, wherein the method is performed by an alpha channel of texture blending/mapping hardware in a three-dimensional (3D) graphics processor.

7. The method of claim 1, wherein the parametric surface comprises control points that dictate a shape of the parametric surface, the trimming texture being applied to the shape of the parametric surface dictated by the control points.

8. The method of claim 1, wherein the polygons have texture coordinates that are used in defining a texture of the polygons.

9. An article comprising a machine-readable medium that stores instructions for use in trimming a parametric surface, the instructions for causing a processing device to:
prior to rendering the parametric surface:
produce a trimming texture, the trimming texture comprising a texture map image representation of a trimming curve for the parametric surface, the trimming curve defining trimmed and untrimmed portions, the untrimmed portion comprising opaque pixels and the trimmed portion comprising transparent pixels; and
during rendering of the parametric surface:
obtain a list of polygons that define the parametric surface; and
draw the polygons to generate the parametric surface, wherein drawing comprises applying the trimming texture to the polygons, the trimming texture being applied by texture mapping the trimming texture onto the polygons to produce the trimmed and untrimmed portions.

10. The article of claim 9, wherein the trimming texture is produced from a plurality of trimming curves for the parametric surface.

11. The article of claim 9, further comprising instructions for causing the processing device to:
obtain a material texture for the parametric surface; and
apply the material texture to the untrimmed portion.

12. The article of claim 9, wherein the trimming curve is produced from one or more vector-valued functions.

13. The article of claim 9, wherein the parametric surface is part of a three-dimensional model.

14. The article of claim 9, wherein the instructions are executable by an alpha channel of texture blending/mapping hardware in a three-dimensional (3D) graphics processor.

15. The article of claim 9, wherein the parametric surface comprises control points that dictate a shape of the parametric surface, the trimming texture being applied to the shape of the parametric surface dictated by the control points.

16. An apparatus for use in trimming a parametric surface, comprising:
memory which stores executable instructions; and
a processor that executes the instructions to:
prior to rendering the parametric surface:
produce a trimming texture, the trimming texture comprising a texture map image representation of a trimming curve for the parametric surface, the trimming curve defining trimmed and untrimmed portions, the untrimmed portion comprising opaque pixels and the trimmed portion comprising transparent pixels; and
during rendering of the parametric surface:
obtain a list of polygons that define the parametric surface; and
draw the polygons to generate the parametric surface, wherein drawing comprises applying the trimming texture based on a trimming curve to the polygons, the trimming texture being applied by texture mapping the trimming texture onto the polygons to produce the trimmed and untrimmed portions.

17. The apparatus of claim 16, wherein the trimming texture is produced from a plurality of trimming curves for the parametric surface.

18. The apparatus of claim 16, wherein the processor executes instructions to:
obtain a material texture for the parametric surface; and
apply the material texture to the untrimmed portion.

19. The article of claim 16, wherein the polygons have texture coordinates that are used in defining a texture of the polygons.

20. The apparatus of claim 16, wherein the trimming curve is produced from one or more vector-valued functions.

21. The apparatus of claim 16, wherein the parametric surface is part of a three-dimensional model.

22. The apparatus of claim 16, wherein the processor comprises a three-dimensional (3D) graphics processor having texture blending/mapping hardware and an alpha channel.

23. The apparatus of claim 16, wherein the parametric surface comprises control points that dictate a shape of the parametric surface, the trimming texture being applied to the shape of the parametric surface dictated by the control points.

24. The apparatus of claim 16, wherein the polygons have texture coordinates that are used in defining a texture of the polygons.

* * * * *